Figure 1:
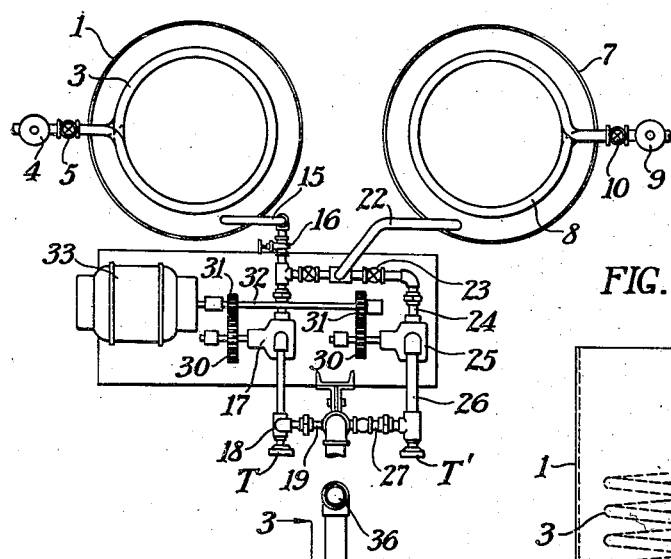

March 9, 1943.  C. F. PAYNE  2,313,574
APPARATUS FOR AND METHOD OF CONTINUOUSLY COOKING STARCH
Filed Jan. 13, 1940

CHARLES F. PAYNE
INVENTOR

BY
ATTORNEYS

Patented Mar. 9, 1943

2,313,574

UNITED STATES PATENT OFFICE 2,313,574

APPARATUS FOR AND METHOD OF CONTINUOUSLY COOKING STARCH

Charles F. Payne, Rochester, N. Y., assignor to Eastman Kodak Company, Rochester, N. Y., a corporation of New Jersey Application January 13, 1940, Serial No. 313,730

6 Claims. (Cl. 127—28)

This application relates to a method of and apparatus for continuously cooking starch and is particularly designed for furnishing cooked starch to the beating engine of a paper making machine. One object of my invention is to provide an apparatus in which starch can be continuously cooked and in which the cooking temperatures may be held constant. Another object of my invention is to provide an apparatus which can be run intermittently if desired and from which starch cooked to a predetermined degree can be obtained over short or relatively long periods of time. Another object of my invention is to provide a starch cooking apparatus in which the mechanism is simple and readily controllable and in which the desired rates of flow can be readily maintained. Still another object of my invention is to provide an improved method of continuously cooking starch and a method for maintaining the cooked starch in an extremely uniform condition. Other objects will appear from the following specification the novel features being particularly pointed out in the claims at the end thereof.

It has always been difficult to properly prepare starch paste such as is commonly used in making certain grades of paper because it has been difficult to cook the starch with a sufficient degree of uniformity. When cooked starch is mixed with or suspended in water, it is quite a good insulating material and the practice of introducing steam into this water-paste mixture has not produced satisfactory results because certain parts of the starch or certain areas of the starch in the cooking kettle would be heated more than other parts so that the result has not always been uniform. For paper making it is desirable to cook the starch sufficiently to burst the starch granules. If not cooked at a sufficiently high temperature, the granules are not burst and if cooked at too high a temperature the starch granules are completely disrupted and are entirely unsuitable for the better grades of paper. With the old fashioned cooking kettles it frequently happened that some of the starch would be properly cooked, some undercooked and some overcooked, so that absolute uniformity of the product could not be obtained.

By providing a machine which can work continuously under extremely uniform conditions, I have been able to provide continuously cooked starch in an extremely uniform manner so that all of the starch cooked by my improved method will result in a usable and quite uniformly cooked product.

Figure 2:
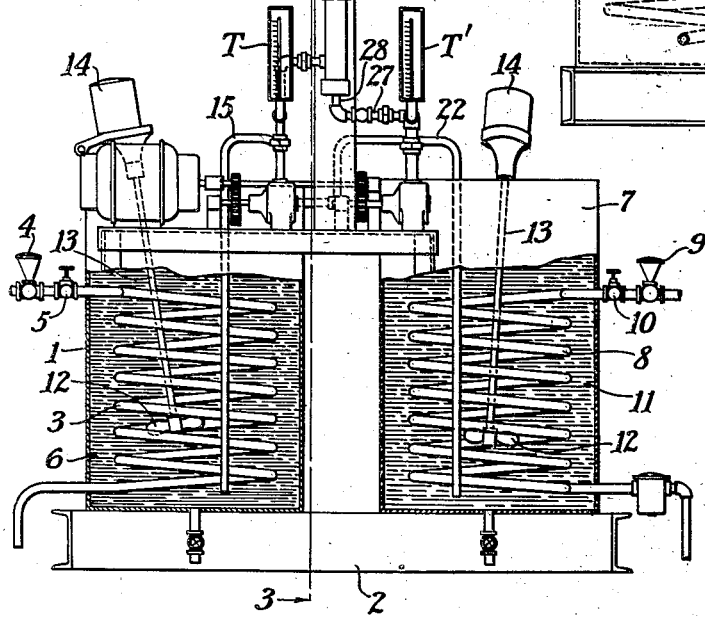
Figure 4:
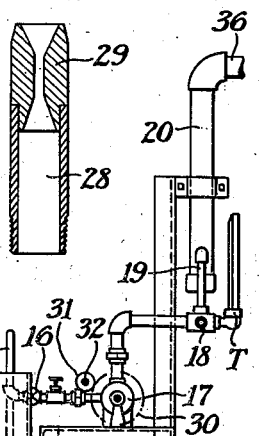
Figure 3:
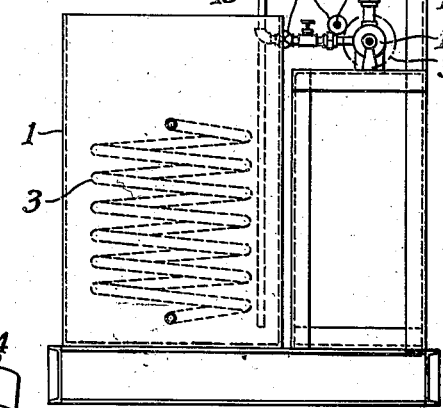
Figure 5:
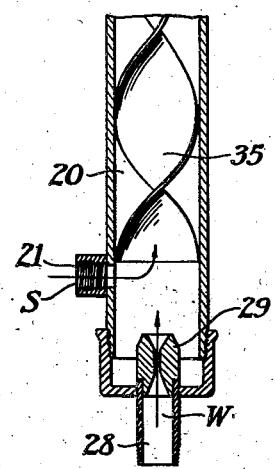

Coming now to the drawing wherein like reference characters denote like parts throughout:

Fig. 1 is a plan view of a starch cooking machine constructed in accordance and embodying a preferred form of my invention, Fig. 2 is a part side elevation and part section of the machine shown in Fig. 1, Fig. 3 is a section taken on line 3—3 of Fig. 2, Fig. 4 is an enlarged fragmentary view of a hot water nozzle, and Fig. 5 is an enlarged fragmentary sectional view of the lower portion of the starch mixing chamber.

I have illustrated in the drawing one of the methods by which uniformly cooked starch can be produced and it is to be understood that the apparatus shown in the drawing, while a preferred embodiment of my invention constitutes only one way of carrying out my method.

I prefer to provide a tank 1 which may be placed on a suitable platform or support 2 in which tank I provide a coil 3 for hot water or for some other temperature controlling medium which may be controlled by the diaphragm valve 4 and the globe valve 5. Through this coil I circulate water of a predetermined temperature so that the mixture 6 of uncooked starch and water in the tank 1 may be held at a fixed temperature. This temperature may conveniently be held at 130° F.

On the platform 2 there is a second tank 7 having a steam or other temperature controlling coil 8 controlled by the diaphragm valve 9 and the globe valve 10 the purpose of this coil being to accurately hold water indicated at 11 in the tank 7 at a definite temperature. The temperature of this water for certain types of corn starch cooking may be 190° F. In each of the tanks there is a mixing and circulating propeller 12 carried by a shaft 13 turned by a mixing motor 14 so that the temperature of the solutions carried by the tanks is maintained extremely accurately in the mass of fluid in these tanks.

The cooking temperatures for various starches vary with the particular material and with the result which is desired to be obtained. As an example, where corn starch is to be cooked the proper cooking temperature for a starch paste suitable for paper making should be between 168–172° F. It is even desirable to hold the temperature somewhat closer to 170° than the range above mentioned although satisfactory results can be obtained if the temperature does not vary beyond these limits.

Other types of starches have different and usually critical cooking temperatures. For instance, tapioca starch is cooked at a lower temperature or approximately 155° and various other starches have different cooking times. I have indicated, by way of example to illustrate my invention, the cooking of a corn starch paste.

With the water suspension in tank 1 and the hot water in tank 8 it is only necessary to bring streams of these two into intimate contact and to raise the temperature of the starch to approximately 170° to burst the starch granules without disrupting them. This may be accomplished in the following manner:

A pipe 15 leads from the tank 1 through a valve 16 to a metering pump 17 which may pump the uncooked starch suspension upwardly through a pipe 18 and through a second pipe 19 into a mixing chamber 20, the starch passing through the threaded coupling 21 and into the mixing chamber just above a jet of hot water pumped from the tank 7.

The pipe 22 leads from the tank 7 through the valve 23 and pipe 24 to the metering pump 25 which forces the hot water through pipes 26 and 27 thence upwardly through the pipe 28 which leads to the spray nozzle 29 as shown in Figs. 4 and 5.

Both of the metering pumps 17 and 25 are driven through gears 30 and pinions 31 each of which are carried by shaft 32 of the motor 33. Thus both of the pumps will be driven at an exactly constant speed ratio and the flow of the warm starch suspension and hot water can be accurately controlled.

Referring to Fig. 5, it will be noticed that the starch suspension S enters through the coupling 21 in a direction substantially at right angles to the hot water W passing through the nozzle 29. Because of the reduced area of the nozzle, the hot water is sprayed with considerable force into the relatively cool starch suspension immediately raising the temperature of the starch, reaching all of the starch granules as the mixture is forced upwardly through the mixing chamber 20 and about the baffles 35 which further tend to mix the hot water with the starch to raise it to the cooking temperature. A pipe 36 leading from the top of the mixing chamber 20 may lead directly to a beating engine and while I contemplate using a beating engine which may operate continuously the more usual type of beating engine may be loaded at even intervals, say every fifteen minutes, and, since the loading operation takes a predetermined time, if desired the cooked starch may be furnished at intervals with the stuff being poured into the beating engine.

Thus the present apparatus is particularly suitable for furnishing correctly cooked starch to a beating engine either continuously or semi-continuously to suit the conditions of work.

As will be seen from the above description, the cooking of the starch takes place in a very short time and the cooking temperatures are accurately maintained because metered quantities of starch suspension at one temperature is thoroughly intermingled and mixed with metered quantities of hot water which raise the temperature of the mixture to the exact amount required for proper cooking.

The size of the tanks 1 and 7 may be controlled by the amount of material which must be furnished although it is possible, of course, to replenish the starch supply at the required temperature while starch is actually being cooked through the operation of the metering pumps 17 and 25.

Since starch paste acts as quite a good insulating material, the flow of starch suspension into the mixing chamber is preferably kept comparatively small so that the jet of hot water passing through the nozzle 29 can immediately reach all of the starch granules as they enter the mixing chamber. In this way the difficulty of improper cooking may be overcome and a uniform product will result.

Thermometers T and T' are connected to the starch pipe line 15 and the hot water pipe line 27 to indicate the temperature of these fluids just before they reach the mixing chamber 20.

I claim:

1. In a starch cooker the combination with a tank for a starch and water mixture, of a tank for hot water, means for accurately controlling the temperatures of the starch mixture and hot water in these tanks, a mixing chamber, pipe lines leading from each tank to the mixing chamber, means for intermixing the starch mixture and hot water in the mixing chamber, metering pumps on each pipe line for pumping predetermined quantities of starch and hot water simultaneously into the mixing chamber to continuously cook the starch.

2. In a starch cooker the combination with a tank for a starch and water mixture, of a tank for hot water, means for accurately controlling the temperatures of the starch mixture and hot water in these tanks, a mixing chamber pipe lines leading from each tank to the mixing chamber, means for intermixing the starch mixture and hot water in the mixing chamber, said mixing chamber comprising a cylindrical chamber, baffles for intermixing materials in the cylindrical chamber, metering pumps on each pipe line for pumping predetermined quantities of starch and hot water simultaneously into the mixing chamber to continuously cook the starch.

3. In a starch cooker the combination with a tank for a starch and water mixture, of a tank for hot water, means for accurately controlling the temperatures of the starch mixture and hot water in these tanks, a mixing chamber, means for intermixing the starch mixture and hot water in the mixing chamber, pipe lines leading from each tank to the mixing chamber, said mixing chamber comprising a cylindrical chamber, baffles for intermixing materials in the cylindrical chamber, the connections between said pipes and said chamber being at the bottom thereof for forcing the material to be mixed upwardly through the baffles, metering pumps on each pipe for pumping predetermined quantities of starch and hot water simultaneously into the mixing chamber to continuously cook the starch.

4. In a starch cooker the combination with a tank for a starch and water mixture, of a tank for hot water, means for accurately controlling the temperatures of the starch mixture and hot water in said tanks, a mixing chamber, pipe lines leading from each tank to the mixing chamber, means for intermixing the starch mixture and hot water in the mixing chamber comprising a cylindrical chamber, baffles in the cylindrical chamber, connections between said pipes and said chamber at the bottom thereof for forcing the material to be mixed upwardly through the baffles, metering pumps on each pipe line for pumping predetermined quantities of the starch mixture and hot water simultaneously into the mixing chamber to continuously cook the starch, the pipe line leading to the chamber from the mixing chamber including a nozzle at the bottom of the hot water tank to mix and intermingle with the starch mixture introduced to the mixing chamber and to force, by fluid pressure, the starch mixture through the baffles to thoroughly cook the starch.

5. A method of continuously cooking starch comprising mixing starch with water at a predetermined temperature, flowing said mixture through a mixing chamber, introducing hot water at a predetermined temperature into the mixing chamber with the starch mixture raising the temperature thereof to a predetermined degree while continuing to flow the mixture of starch and water and hot water in constant proportions through a predetermined path to cook the starch for a predetermined time.

6. A method of continuously cooking corn starch for use in paper making comprising mixing starch with water and holding this mixture at approximately 130° F., flowing this mixture through a path at a predetermined rate and thoroughly mixing therewith a jet of hot water of approximately 190° F., the proportions of the starch and water mixture of 130° F. and the hot water of 190° F. cooking the starch at a temperature of approximately 170° F. as the mixture flows through its path.

CHARLES F. PAYNE.